(12) United States Patent
Lee et al.

(10) Patent No.: US 9,484,600 B2
(45) Date of Patent: Nov. 1, 2016

(54) ELECTROLYTE FOR SODIUM SECONDARY BATTERY AND SODIUM SECONDARY BATTERY EMPLOYING THE SAME

(71) Applicant: SK Innovation Co., Ltd., Seoul (KR)

(72) Inventors: SeungOk Lee, Daejeon (KR); Dai In Park, Daejeon (KR); JeongSoo Kim, Daejeon (KR); JeHyun Chae, Daejeon (KR); WonSang Koh, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/677,667

(22) Filed: Apr. 2, 2015

(65) Prior Publication Data

US 2015/0288035 A1  Oct. 8, 2015

(30) Foreign Application Priority Data

Apr. 4, 2014  (KR) .................. 10-2014-0040737

(51) Int. Cl.
*H01M 4/36* (2006.01)
*H01M 10/39* (2006.01)
*H01M 4/38* (2006.01)

(52) U.S. Cl.
CPC ............. *H01M 10/399* (2013.01); *H01M 4/38* (2013.01); *H01M 4/381* (2013.01); *H01M 2300/0054* (2013.01); *H01M 2300/0057* (2013.01)

(58) Field of Classification Search
CPC .................. H01M 10/399; H01M 2300/0054; H01M 2300/0057; H01M 4/38; H01M 4/381
See application file for complete search history.

(56) References Cited

U.S. PATENT DOCUMENTS

| 2003/0054255 A1 | 3/2003 | Hidaka et al. | |
|---|---|---|---|
| 2011/0024288 A1* | 2/2011 | Bhavaraju | C10G 3/00 204/252 |
| 2013/0084474 A1* | 4/2013 | Mills | H01M 4/9016 429/9 |

* cited by examiner

*Primary Examiner* — Patrick Ryan
*Assistant Examiner* — Ben Lewis
(74) *Attorney, Agent, or Firm* — The Webb Law Firm (57) ABSTRACT

Provided are an electrolyte for a sodium secondary battery, and a sodium secondary battery employing the same, and more particularly, a sodium secondary battery including an anode containing sodium, a cathode containing a transition metal, and a sodium ion conductive solid electrolyte provided between the anode and the cathode. The cathode is impregnated with a mixed salt electrolyte containing a molten sodium salt and an electrolyte additive, and the electrolyte additive contains a non-halogen sodium salt and a metal halide compound simultaneously.

17 Claims, 4 Drawing Sheets

ELECTROLYTE FOR SODIUM SECONDARY BATTERY AND SODIUM SECONDARY BATTERY EMPLOYING THE SAME

CROSS-REFERENCE TO RELATED APPLICATIONS

This application claims priority under 35 U.S.C. §119 to Korean Patent Application No. 10-2014-0040737, filed on Apr. 4, 2014, in the Korean Intellectual Property Office, the disclosure of which is incorporated herein by reference in its entirety.

TECHNICAL FIELD

The following disclosure relates to an electrolyte for a sodium secondary battery, and a sodium secondary battery employing the same.

BACKGROUND

As the use of new renewable energy is rapidly increasing, a demand for an energy storage system using a battery is rapidly increasing. As such batteries, a lead battery, a nickel/hydrogen battery, a vanadium battery and a lithium battery may be used. However, since the lead battery and the nickel/hydrogen battery have very low energy density, they require larger space for storing the same amount of energy. In addition, the vanadium battery has the problems in that it causes environmental pollution due to the use of a heavy metal-containing solution, and performance degradation due to the immigration of a small amount of a material between an anode and a cathode through a membrane separating the anode and the cathode, and thus, has not been commercialized on a large scale. The lithium battery having excellent energy density and output characteristic is technologically advantageous, but not economical for use as a secondary battery for large-scale power storage due to resource scarcity of a lithium material.

In order to solve the foregoing problems, many attempts have been made to use sodium which is a rich resource on earth, as a material of the secondary battery. Among those, as disclosed in U.S. Patent Application Publication No. 20030054255, a sodium-sulfur battery using beta alumina having selective conductivity for sodium ions, and having an anode impregnated with sodium, and a cathode impregnated with sulfur, is currently being used as a large-scale power storage device.

However, as to the existing sodium-based secondary battery such as the sodium-sulfur battery or a sodium-nickel chloride battery, considering the conductivity and melting points of the battery components, the sodium-nickel chloride battery has an operating temperature of 250° C. or more, and the sodium-sulfur battery has an operating temperature of 300° C. or more. Due to such problems, those batteries are disadvantageous in economic aspect in manufacture or operation for reinforcement of temperature maintenance, sealability maintenance and safety.

In order to solve the foregoing problems, a room temperature-type, sodium-based battery is being developed, but has a very small output, and much less competitive than a nickel-hydrogen battery or a lithium battery.

RELATED ART DOCUMENT

Patent Document

U.S. Patent Application Publication No. 20030054255

SUMMARY

An embodiment of the present invention is directed to providing a mixed salt electrolyte having a lower melting point by adding a non-halogen sodium salt and a metal halide compound simultaneously to a molten sodium salt, and at the same time, providing a mixed salt electrolyte having a lower melting point, and also being capable of driving a battery without rapid degradation of ion conductivity.

Further, another embodiment of the present invention is directed to providing a sodium secondary battery which is operable at low temperature, prevents deterioration to improve life of a battery, and is non-volatile and non-explosive while having high ion conductivity, by employing a mixed salt electrolyte having a lower melting point by adding a non-halogen sodium salt and a metal halide compound simultaneously to a molten sodium salt, as an electrolyte of a sodium secondary battery.

Further, still another embodiment of the present invention is directed to form a sodium secondary battery to be operable at low temperature, so as to reduce manufacturing cost, and secure safety.

In one general aspect, an electrolyte for a sodium secondary battery includes a molten sodium salt, and an electrolyte additive containing a salt represented by following Chemical Formula 1 and another salt represented by following Chemical Formula 2:

NaA                                                   [Chemical Formula 1]

$MX_3$                                                  [Chemical Formula 2]

wherein Na is a sodium cation; A is an anion of a non-halogen element or a compound containing the non-halogen element; M is a cation of one metal selected from the group consisting of Group 3 or 13 metals; and X is an anion of one element selected from the group consisting of Group 17 halogen elements.

In the electrolyte for a sodium secondary battery according to an exemplary embodiment of the present invention, the NaA may be one or more selected from the group consisting of HCOONa (Sodium formate), $CH_3COONa$ (Sodium acetate), NaOCN (Sodium cyanate), NaSCN (Sodium thio cyanate) and $C_7H_5O_3NSNa$ (Sodium Saccharin).

In the electrolyte for a sodium secondary battery according to an exemplary embodiment of the present invention, the $MX_3$ may be one or more selected from the group consisting of $AlCl_3$, $AlBr_3$ and $AlI_3$.

In the electrolyte for a sodium secondary battery according to an exemplary embodiment of the present invention, the mixed salt electrolyte may contain 0.1 to 30 wt % of the electrolyte additive.

In the electrolyte for a sodium secondary battery according to an exemplary embodiment of the present invention, the electrolyte additive may contain the salt represented by Chemical Formula 1 and the salt represented by Chemical Formula 2 at a mole ratio of 1:1.

In the electrolyte for a sodium secondary battery according to an exemplary embodiment of the present invention, the mixed salt electrolyte may have a melting point of 150° C. or less.

In the electrolyte for a sodium secondary battery according to an exemplary embodiment of the present invention, the mixed salt electrolyte may have ion conductivity of 100 ms/cm or more when melted.

In another general aspect, a sodium secondary battery employs the electrolyte for a sodium secondary battery as described above.

Specifically, the sodium secondary battery according to the present invention may include an anode containing sodium, a cathode containing a transition metal, and a sodium ion conductive solid electrolyte provided between the anode and the cathode, wherein the cathode is impregnated with a mixed salt electrolyte containing a molten sodium salt and an electrolyte additive, and the electrolyte additive contains a salt represented by following Chemical Formula 1 and another salt represented by following Chemical Formula 2 simultaneously:

NaA [Chemical Formula 1]

$MX_3$ [Chemical Formula 2]

wherein Na is a sodium cation; A is an anion of a non-halogen element or a compound containing the non-halogen element; M is a cation of one metal selected from the group consisting of Group 3 or 13 metals; and X is an anion of one element selected from the group consisting of Group 17 halogen elements.

In the sodium secondary battery according to an exemplary embodiment of the present invention, the NaA may be one or more selected from the group consisting of HCOONa (Sodium formate), $CH_3COONa$ (Sodium acetate), NaOCN (Sodium cyanate), NaSCN (Sodium thio cyanate) and $C_7H_5O_3NSNa$ (Sodium Saccharin).

In the sodium secondary battery according to an exemplary embodiment of the present invention, the $MX_3$ may be $AlCl_3$, $AlBr_3$ or $AlI_3$.

In the sodium secondary battery according to an exemplary embodiment of the present invention, the mixed salt electrolyte may contain 0.1 to 30 wt % of the electrolyte additive.

In the sodium secondary battery according to an exemplary embodiment of the present invention, the electrolyte additive may contain the salt represented by Chemical Formula 1 and the salt represented by Chemical Formula 2 at a mole ratio of 1:1.

In the sodium secondary battery according to an exemplary embodiment of the present invention, the anode may contain molten sodium.

In the sodium secondary battery according to an exemplary embodiment of the present invention, the cathode may contain one or more metals selected from the group consisting of nickel (Ni), copper (Cu), iron (Fe), manganese (Mn), cobalt (Co), and an alloy thereof.

In the sodium secondary battery according to an exemplary embodiment of the present invention, the mixed salt electrolyte may have a melting point of 150° C. or less.

In the sodium secondary battery according to an exemplary embodiment of the present invention, the secondary battery may have an operating temperature of 120 to 200° C.

Other features and aspects will be apparent from the following detailed description, the drawings, and the claims.

DETAILED DESCRIPTION OF MAIN ELEMENTS

1: Sodium secondary battery
10: Anode
30: Cathode
35: Mixed salt electrolyte
50: Solid electrolyte

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the sodium secondary battery according to the present invention will be described in detail with reference to the accompanying drawings. The drawings to be provided below are provided by way of example so that the idea of the present invention can be sufficiently transferred to those skilled in the art to which the present invention pertains. Therefore, the present invention is not limited to the drawings provided below but may be modified in many different forms. In addition, the drawings suggested below will be exaggerated in order to clear the spirit and scope of the present invention. In addition, like reference numerals denote like elements throughout the specification.

Technical terms and scientific terms used in the present specification have the general meaning understood by those skilled in the art to which the present invention pertains unless otherwise defined, and a description for the known function and configuration obscuring the present invention will be omitted in the following description and the accompanying drawings.

Generally, sodium aluminum chloride ($NaAlCl_4$) has been employed as a molten salt electrolyte of a secondary battery such as a ZEBRA battery. Such molten sodium aluminum chloride ($NaAlCl_4$) salt has been known as being advantageous in terms of stability and ion conductivity of a sodium secondary battery.

However, considering that the molten sodium aluminum chloride ($NaAlCl_4$) salt has a melting point of 157 to 200° C. depending on its purity, there is a limitation in that the secondary battery employing the molten sodium aluminum chloride (NaAlCl$_4$) salt has a high operating temperature substantially up to 300° C.

Therefore, according to the present invention, a secondary battery operable at relatively low temperature is intended to be provided by employing an electrolyte for a sodium ion battery having a low melting point, in order to improve such limitation.

Figure 1:
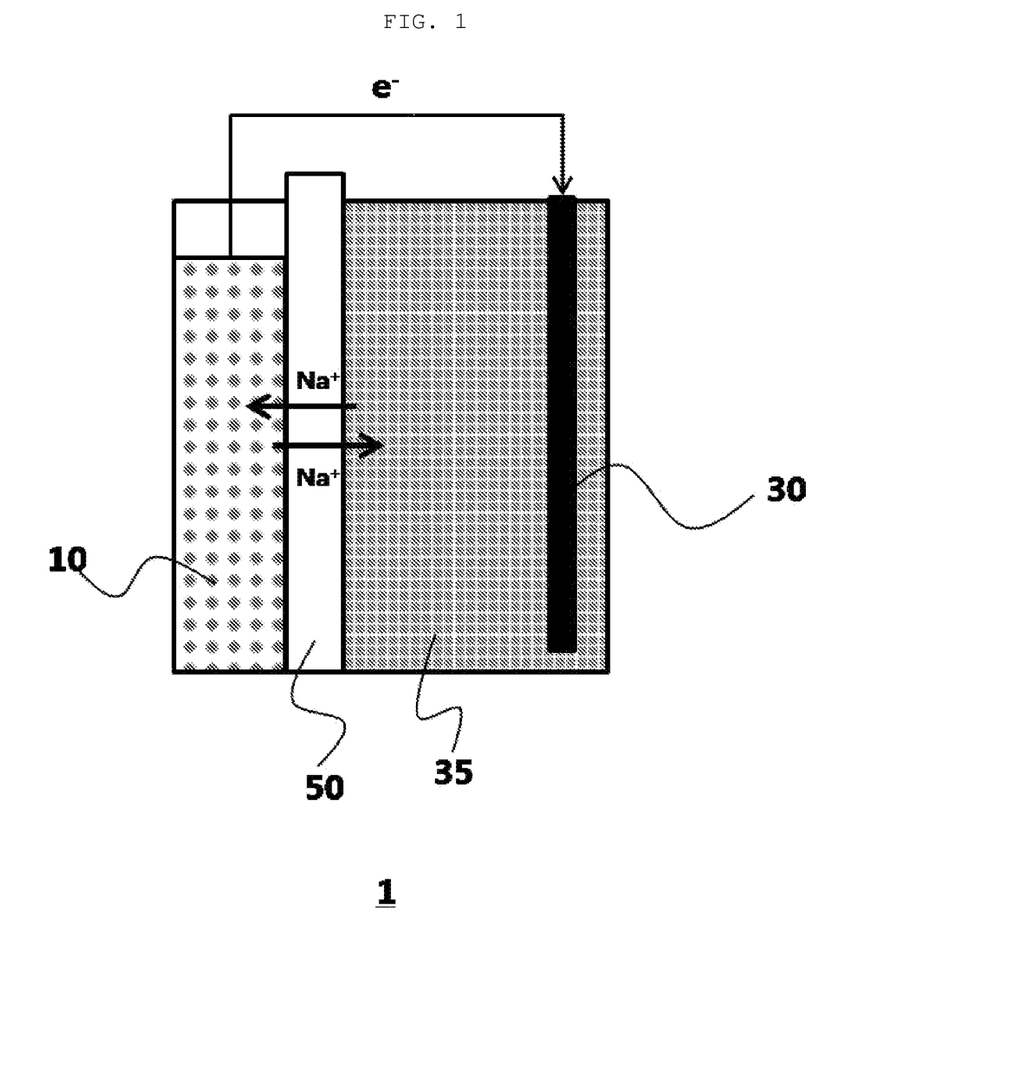
FIG. 1 is a conceptual diagram schematically showing a structure of a sodium secondary battery according to an exemplary embodiment of the present invention.

The sodium secondary battery according to the present invention includes an anode containing sodium, a cathode containing a transition metal, and a sodium ion conductive solid electrolyte provided between the anode and the cathode, wherein the cathode is impregnated with a mixed salt electrolyte containing a molten sodium salt and an electrolyte additive, as shown in FIG. 1. Herein, the electrolyte additive contains a non-halogen sodium salt and a metal halide salt simultaneously.

In the sodium secondary battery according to an exemplary embodiment of the present invention, the anode may contain a sodium metal or a sodium alloy. As a non-limiting example, the sodium alloy may be sodium and cesium, sodium and rubidium, or a mixture thereof. The anode active material may be a solid phase or a liquid phase including a molten phase at an operating temperature of the battery. Herein, in order to implement a battery capacity of 50 Wh/kg or more, the anode active material may be molten sodium (molten Na).

In the sodium secondary battery according to an exemplary embodiment of the present invention, the cathode of the sodium secondary battery may contain a transition metal. Herein, the transition metal may include copper, silver, gold, nickel, palladium, platinum, cobalt, rhodium, iridium, iron, manganese, chromium, vanadium, molybdenum, and the like, preferably include one metal selected from the group consisting of nickel (Ni), copper (Cu), iron (Fe), manganese (Mn), cobalt (Co), and an alloy thereof.

The cathode of the sodium secondary battery according to the present invention may be formed to be impregnated with a mixed salt electrolyte containing a molten sodium salt and an electrolyte additive simultaneously.

Herein, the molten sodium salt may be used without particular limitation, if it is an electrolyte material applicable to the existing sodium secondary battery. However, as a specific and non-limiting example, sodium aluminum chloride (NaAlCl$_4$), sodium aluminum bromide (NaAlBr$_4$), sodium aluminum iodide (NaAlI$_4$) or a mixture thereof may be used, and it is preferred to use sodium aluminum chloride (NaAlCl$_4$) in terms of a melting point, ion conductivity and a degree of ionization.

Further, the electrolyte additive may be characterized by containing a salt represented by following Chemical Formula 1 and another salt represented by following Chemical Formula 2 simultaneously:

NaA [Chemical Formula 1]

MX$_3$ [Chemical Formula 2]

wherein Na is a sodium cation; A is an anion of a non-halogen element or a compound containing the non-halogen element; M is a cation of one metal selected from the group consisting of Group 3 or 13 metals; and X is an anion of one element selected from the group consisting of Group 17 halogen elements. Accordingly, the electrolyte additive of the sodium secondary battery according to the present invention is formed to contain a non-halogen sodium salt represented by Chemical Formula 1 and a metal halide represented by Chemical Formula 2 simultaneously.

Specifically, NaA represented by Chemical Formula 1, contained in the electrolyte additive may be used without particular limitation, if it is a non-halogen element or a non-halogen sodium salt which is a sodium compound containing the non-halogen element. However, as a specific and preferred example, one or two or more mixed salts selected from HCOONa (Sodium formate), CH$_3$COONa (Sodium acetate), NaOCN (Sodium cyanate), NaSCN (Sodium thio cyanate) and C$_7$H$_5$O$_3$NSNa (Sodium Saccharin) are preferred.

In addition, MX$_3$ according to Chemical Formula 2, contained in the electrolyte additive may be used without particular limitation, if it is a metal halide compound. However, as a specific and preferred example, AlCl$_3$, AlBr$_3$ or AlI$_3$ is preferred, and among them, AlCl$_3$ is most preferred.

As such, the sodium secondary battery according to the present invention may be characterized by employing a mixed salt electrolyte containing the above described electrolyte additive, as an electrolyte. As the electrolyte additive contains a non-halogen sodium salt and a metal halide compound simultaneously, surprisingly, an effect of lowering a melting point of the mixed salt electrolyte may be generated, and specifically, the melting point of the mixed salt electrolyte may be lowered to 150° C. or less. Lowering of the melting point may be achieved, as a stable lattice form of the molten sodium salt becomes unstable, by adding the electrolyte additive to the molten sodium salt, according to the present invention.

In addition, as described above, an effect of lowering the melting point of the electrolyte, while surprisingly, as the ion conductivity of the mixed salt electrolyte is above a certain level, enabling efficient driving of the secondary battery employing the electrolyte, may be generated, and specifically, the ion conductivity of the mixed salt electrolyte at 160° C. is characterized as being 100 ms/cm or more.

Specifically, the electrolyte additive containing the non-halogen sodium salt represented by the above Chemical Formula 1 and the metal halide represented by the above Chemical Formula 2 simultaneously, may be reacted in the mixed salt electrolyte, according to following Reaction Formula 1. Herein, the following Reaction Formula 1 represents the case where a non-halogen sodium salt and metal halide contained in the electrolyte additive in the mixed salt electrolyte are mixed at a mole ratio of 1:1, and as such it is preferred that the non-halogen sodium salt and the metal halide contained in the electrolyte additive in the mixed salt electrolyte are mixed at a mole ratio of 1:1, but the present invention is not limited thereto.

NaA+MX$_3$→Na[MX$_3$A] [Reaction Formula 1]

Herein, the non-halogen sodium salt and the metal halide represented by Chemical Formulae 1 and 2, respectively, are ion bonded to each other to produce Na[MX$_3$A], and as the produced Na[MX$_3$A] is added to a molten sodium salt, the stable lattice form of the molten sodium salt becomes unstable to lower the melting point of the mixed salt electrolyte.

It is preferred that the mixed salt electrolyte contains 0.1 to 30 wt % of the electrolyte additive, and it is more preferred to contain 1 to 10 wt % of the electrolyte additive. Specifically, if the content of the electrolyte additive in the mixed salt electrolyte is less than 0.1 wt %, the lowering of the melting point of the mixed salt electrolyte may not be achieved, and if the content of the electrolyte additive in the mixed salt electrolyte is above 30 wt %, ion conductivity becomes low, and battery driving is impossible.

Meanwhile, the sodium secondary battery according to an exemplary embodiment of the present invention may be expected to undergo a charging and discharging reaction within a battery operating temperature range, by employing a liquid mixed electrolyte. Specifically, such charging and discharging reaction is described by the reaction according to following Reaction Formulae 2 and 3.

Following Reaction Formulae 2 and 3 illustrate a charging and discharging reaction employing nickel (Ni) as a cathode material, and a mixed salt electrolyte containing an electrolyte additive in which sodium formic acid (HCOONa) and aluminum chloride (AlCl$_3$) are mixed at a mole ratio of 1:1, and sodium aluminum chloride (NaAlCl$_4$), as an example, however, the present invention is not limited thereto. Herein, the content of the electrolyte additive (HCOONa+AlCl$_3$) contained in the mixed salt electrolyte corresponds to about 10.45 wt %.

The thus formed sodium secondary battery according to the present invention undergoes charging by following Reaction Formula 2, and discharging by following Reaction Formula 3, and such charging and discharging reaction of the battery may occur on a cathode of a sodium secondary battery.

Ni+2NaCl→NiCl$_2$+2Na$^+$+2e$^-$     [Reaction Formula 2]

NiCl$_2$+2Na$^+$+2e$^-$→Ni+2NaCl     [Reaction Formula 3]

Herein, as the present invention is a sodium secondary battery, alkali metal ions (that is, sodium ions) produced by the charging reaction of the battery may be an ion conducting (transporting) material passing through a solid electrolyte in the battery to be directly delivered to an anode. In addition, as the mixed electrolyte according to the present invention is formed to contain sodium ions, sodium ions dissociated from the mixed electrolyte may also play a role of an ion conducting (transporting) material, and thus, be preferred in terms of improving ion conductivity of the sodium ion battery.

Further, in the sodium secondary battery according to an exemplary embodiment of the present invention, the solid electrolyte may be provided between a cathode and an anode, and formed of a sodium ion conductive solid electrolyte. Herein, the sodium ion conductive solid electrolyte may be any material separating a cathode and an anode, and having selective conductivity to sodium ions, and for selective conduction of sodium ions, any solid electrolyte generally used in a battery field will be fine. As a non-limiting example, the solid electrolyte according to an exemplary embodiment of the present invention may be sodium super ion conductor (Na super ionic conductor, NaSICON), β-alumina or β"-alumina. Further, as a non-limiting example, sodium super ionic conductor (NASICON) may include a Na—Zr—Si—O-based composite oxide, a Na—Zr—Si—P—O-based composite oxide, a Y-doped Na—Zr—Si—P—O-based composite oxide, a Fe-doped Na—Zr—Si—P—O-based composite oxide, or a mixture thereof, and specifically, Na$_3$Zr$_2$Si$_2$PO$_{12}$, Na$_{1+x}$Si$_x$Zr$_2$P$_3$-xO$_{12}$ (x is a real number of 1.6<x<2.4), Y or Fe-doped Na$_3$Zr$_2$Si$_2$PO$_{12}$, Y or Fe-doped Na$_{1+x}$Si$_x$Zr$_2$P$_3$-xO$_{12}$ (x is a real number of 1.6<x<2.4), or a mixture thereof.

In the sodium secondary battery according to an exemplary embodiment of the present invention, based on the shape of the solid electrolyte separating a cathode and an anode to divide a cathode space and an anode space, the sodium secondary battery may have a planar battery structure including a planar shaped solid electrolyte, or a tubular battery structure including a tube shaped solid electrolyte having a closed end.

Meanwhile, the existing sodium-based secondary battery had a disadvantage, for example, a sodium-nickel chloride battery should operate at a minimum of 250° C. or more, and a sodium-sulfur battery should have an operating temperature of at a minimum of 300° C. or more, considering the conductivity and the melting point of battery constituents.

However, as the sodium secondary battery according to the present invention includes the electrolyte additive containing the non-halogen sodium salt and the metal halide simultaneously, the stable lattice formation of a molten sodium salt in an electrolyte is interrupted, so that it is possible that the lowering of ion conductivity of the sodium secondary battery is not generated, while the battery is operable at low temperature due to a low melting point of the electrolyte. Specifically, the operating temperature of a sodium secondary battery according to the present invention may be 300° C. or less, and more specifically, 120° C. or more and 300° C. or less. More preferably, the temperature may be 120° C. or more and 200° C. or less.

Hereinafter, specific examples according to the present invention will be described in detail.

[Mixed Salt Electrolyte]

The non-halogen sodium salt and the metal halide compound according to the present invention were simultaneously added to and mixed with a NaAlCl$_4$ molten sodium salt to prepare a mixed salt electrolyte, and the melting temperature (melting point) of the electrolyte was measured and represented in the following Table 1.

TABLE 1

| Classification | Electrolyte additive (A + B) | | Molten sodium salt (C) | Mole ratio (A:B:C) | Content of electrolyte additive (wt %) | Melting point (° C.) | Ion conductivity (ms/cm) (at, 160° C.) |
| --- | --- | --- | --- | --- | --- | --- | --- |
| | Non-halogen sodium salt (A) | Metal halide (B) | | | | | |
| Comparative Example 1 | — | — | NaAlCl$_4$ | 0:0:1 | 100 | 157 | 195.34 |
| Example 1 | HCOONa | AlCl$_3$ | NaAlCl$_4$ | 1:1:9 | 10.45 | 125 | 234.00 |
| Example 2 | CH$_3$COONa | AlCl$_3$ | NaAlCl$_4$ | 1:1:9 | 11.09 | 135 | 174.81 |
| Example 3 | NaOCN | AlCl$_3$ | NaAlCl$_4$ | 1:1:9 | 10.31 | 130 | 183.73 |
| Example 4 | NaSCN | AlCl$_3$ | NaAlCl$_4$ | 1:1:9 | 11.05 | 120 | 186.35 |
| Example 5 | C$_7$H$_5$NO$_3$SNa | AlCl$_3$ | NaAlCl$_4$ | 1:1:9 | 16.44 | 137 | 139.69 |
| Example 6 | C$_7$H$_5$NO$_3$SNa | AlCl$_3$ | NaAlCl$_4$ | 0.5:0.5:9.5 | 8.52 | 145 | 192.99 |

Herein, the content of the electrolyte additive refers to the content of the electrolyte additive contained in the total mixed salt electrolyte, and was calculated according to the following Calculation Formula:

Content of electrolyte additive (wt %)=(A+B)weight/(A+B+C)weight×100 wherein A is a non-halogen sodium salt; B is a metal halide; C is a molten sodium salt; (A+B) weight is a weight of electrolyte additive; and (A+B+C) weight is a weight of a total mixed salt electrolyte.

Referring to above Table 1, it is confirmed that the melting points of the sodium secondary battery mixed salt electrolyte according to the present invention in Examples 1 to 6 were lowered, as compared with the electrolyte consisting of only sodium aluminum chloride (NaAlCl$_4$) of Comparative Example 1. Though the ion conductivity values of Examples 2 to 6 was not high as compared with that of Comparative Example 1, the degree of ion conductivity may be selectively employed depending on the use of the battery, and thus, the ion conductivity value of the sodium ion battery according to the present invention does not limit the present invention.

However, in terms of lowering the melting point of the mixed salt electrolyte while securing efficient ion conductivity in a battery operation, and preventing problems such as thermal degeneration, high melting point and electric degeneration, Examples 1, 3 and 6 are preferred. Further, in terms of lowering the melting point of the mixed salt electrolyte and having excellent ion conductivity, as compared with Comparative Example 1, Example 1 is most preferred.

[Operation of Sodium Secondary Battery Depending on Employment of Electrolyte]

The charging and discharging graph of the sodium secondary battery manufactured according to the present invention was confirmed to show that the sodium secondary battery is operated well.

Specifically, a nickel (Ni) cathode, a molten sodium anode, and a NaSICON solid electrolyte were used, and the cathode was impregnated with the mixed salt electrolyte of Examples 1, 3 and 6 to manufacture a sodium secondary battery.

Figure 2:
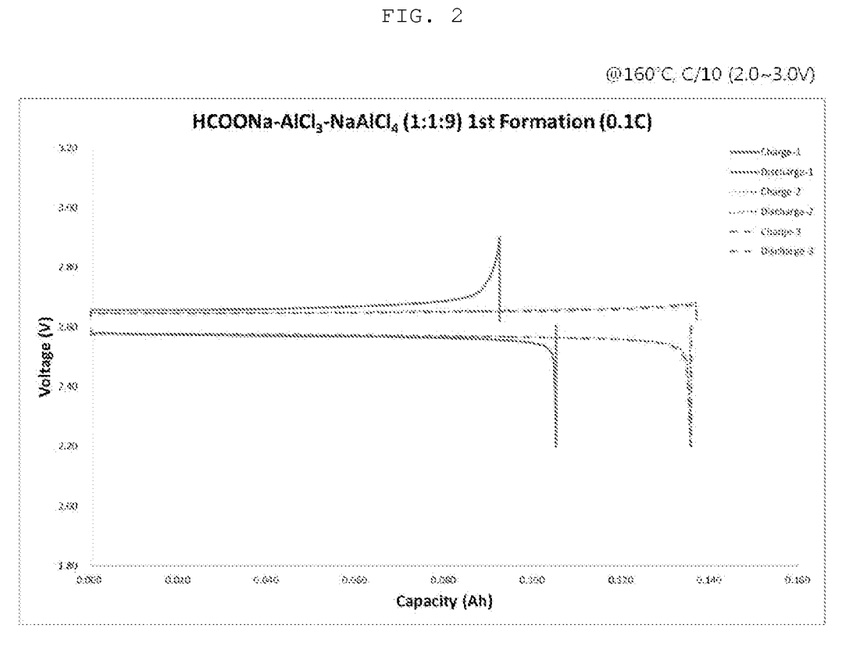
FIG. 2 is a charging-discharging graph of a sodium secondary battery manufactured according to an exemplary embodiment of the present invention.
Figure 3:
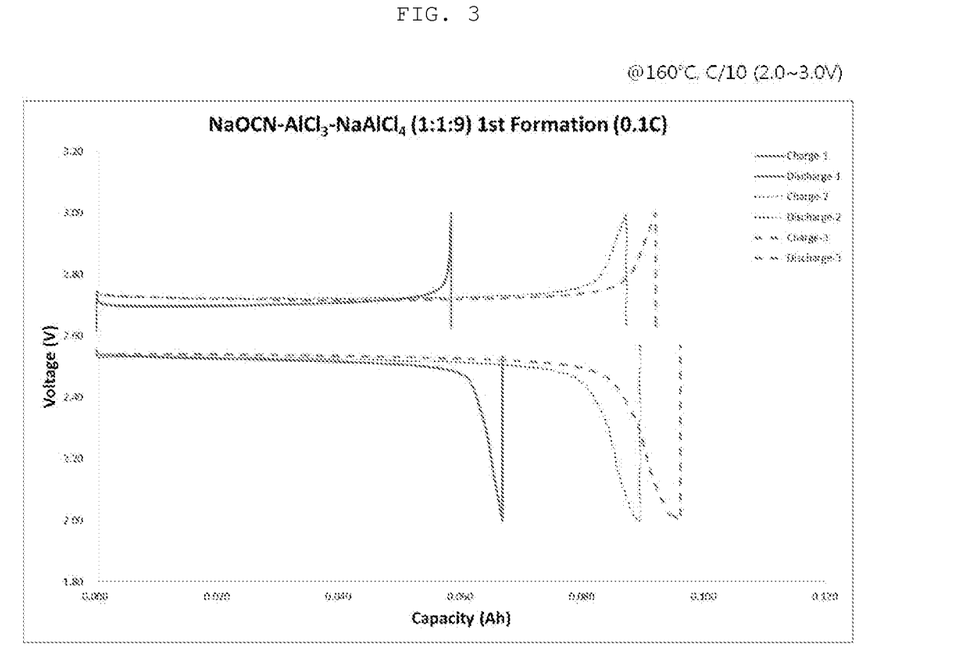
FIG. 3 is a charging-discharging graph of a sodium secondary battery manufactured according to another exemplary embodiment of the present invention.
Figure 4:
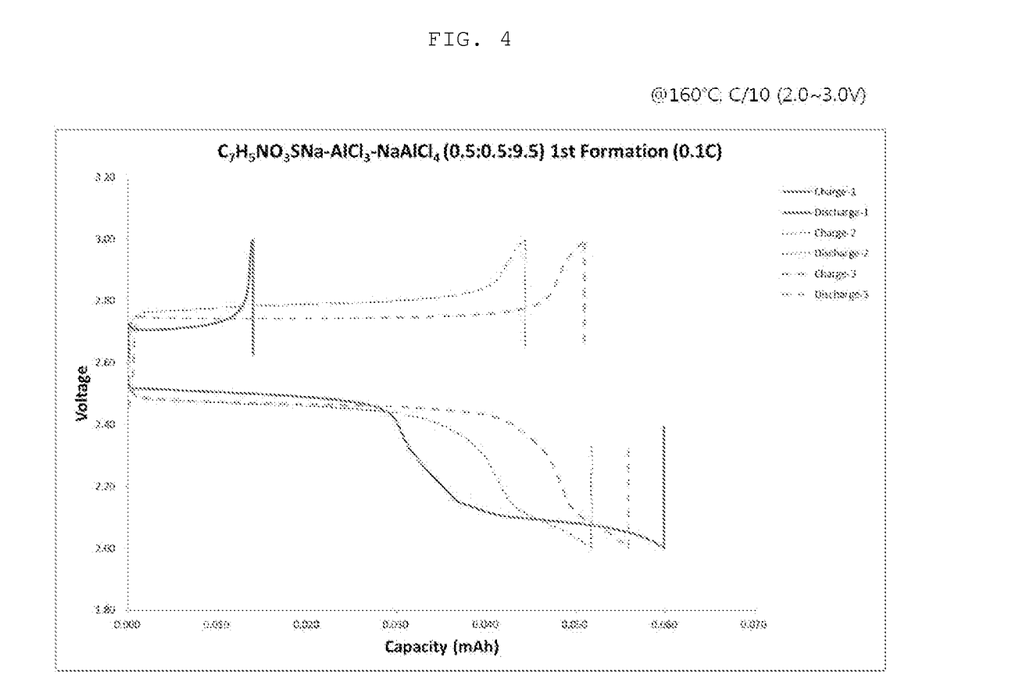
FIG. 4 is a charging-discharging graph of a sodium secondary battery manufactured according to still another exemplary embodiment of the present invention.

Referring to FIGS. 2 to 4, it is confirmed that when the sodium secondary battery manufactured according to the present invention is charged and discharged at 0.1 C rate at an operating temperature of about 160° C., it is operated well at battery voltage of 2.0-3.0 V (volt).

Specifically, since the molten sodium aluminum chloride (NaAlCl4) salt as the existing electrolyte has a melting point of 157 to 200° C. depending on its purity, a secondary battery employing the molten sodium aluminum chloride (NaAlCl4) salt electrolyte of Comparative Example (melting point: 157° C.) has an operating temperature substantially up to 300° C.

However, FIG. 2 shows a sodium secondary battery employing the mixed salt electrolyte of Example 1 having a melting point of 125° C., FIG. 3 shows a sodium secondary battery employing the mixed salt electrolyte of Example 3 having a melting point of 130° C., and FIG. 4 shows a sodium secondary battery employing the mixed salt electrolyte of Example 6 having a melting point of 145° C., wherein the melting points of the mixed salt electrolytes of Examples 1, and 6 are ranged from 125 to 145° C., so that the electrolytes are in a liquid electrolyte state within the range, and thus, it is confirmed that the sodium secondary batteries employing those electrolytes are all well-operable at 160° C.

The sodium secondary battery according to the present invention may employ a mixed salt electrolyte having a low melting point as compared with the existing molten sodium salt electrolyte, such that it is operable at low temperature, prevents deterioration to improve battery life, and has non-volatile and non-explosive characteristics simultaneously with high ion conductivity.

Further, the sodium secondary battery according to the present invention is configured to be operable at low temperature, and has an advantage of reducing manufacturing cost and securing stability.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. An electrolyte for a sodium secondary battery comprising a molten sodium salt, and 0.1 to 30 wt % of an electrolyte additive containing a salt represented by following Chemical Formula 1 and another salt represented by following Chemical Formula 2:

NaA       [Chemical Formula 1]

MX3       [Chemical Formula 2]

wherein
Na is a sodium cation;
A is an anion of a non-halogen element or a compound containing the non-halogen element;
M is a cation of one metal selected from the group consisting of Group 3 or Group 13 metals; and
X is an anion of one element selected from the group consisting of Group 17 halogen elements.

2. The electrolyte for a sodium secondary battery of claim 1, wherein the NaA is one or more selected from the group consisting of HCOONa (Sodium formate), CH3COONa (Sodium acetate), NaOCN (Sodium cyanate), NaSCN (Sodium thio cyanate) and C7H5O3NSNa (Sodium Saccharin).

3. The electrolyte for a sodium secondary battery of claim 1, wherein the MX3 is one or more selected from the group consisting of AlCl3, AlBr3 and AlI3.

4. The electrolyte for a sodium secondary battery of claim 1, wherein the electrolyte additive contains the salt represented by Chemical Formula 1 and the salt represented by Chemical Formula 2 at a mole ratio of 1:1.

5. The electrolyte for a sodium secondary battery of claim 1, wherein it has a melting point of 150° C. or less.

6. The electrolyte for a sodium secondary battery of claim 1, wherein it has ion conductivity of 100 ms/cm or more when melted.

7. A sodium secondary battery comprising:
a cathode impregnated with the electrolyte for a sodium secondary battery of claim 1, and containing a transition metal;
an anode containing sodium; and
a sodium ion conductive solid electrolyte provided between the cathode and the anode.

8. The sodium secondary battery of claim 7, wherein the anode contains molten sodium.

9. The sodium secondary battery of claim 7, wherein the cathode contains one or more metals selected from the group consisting of nickel (Ni), copper (Cu), iron (Fe), manganese (Mn), cobalt (Co), and an alloy thereof.

10. An electrolyte for a sodium secondary battery comprising a molten sodium salt, and an electrolyte additive containing a salt represented by following Chemical Formula 1 and another salt represented by following Chemical Formula 2 at a mole ratio of 1:1:

NaA  [Chemical Formula 1]

MX3  [Chemical Formula 2]

wherein

Na is a sodium cation;

A is an anion of a non-halogen element or a compound containing the non-halogen element;

M is a cation of one metal selected from the group consisting of Group 3 or Group 13 metals; and X is an anion of one element selected from the group consisting of Group 17 halogen elements.

11. The electrolyte for a sodium secondary battery of claim 10, wherein the NaA is one or more selected from the group consisting of HCOONa (Sodium formate), CH3COONa (Sodium acetate), NaOCN (Sodium cyanate), NaSCN (Sodium thio cyanate) and C7H5O3NSNa (Sodium Saccharin).

12. The electrolyte for a sodium secondary battery of claim 10, wherein the MX3 is one or more selected from the group consisting of AlCl3, AlBr3 and AlI3.

13. The electrolyte for a sodium secondary battery of claim 10, wherein it has a melting point of 150° C. or less.

14. The electrolyte for a sodium secondary battery of claim 10, wherein it has ion conductivity of 100 ms/cm or more when melted.

15. A sodium secondary battery comprising:
a cathode impregnated with the electrolyte for a sodium secondary battery of claim 10, and containing a transition metal;
an anode containing sodium; and
a sodium ion conductive solid electrolyte provided between the cathode and the anode.

16. The sodium secondary battery of claim 15, wherein the anode contains molten sodium.

17. The sodium secondary battery of claim 15, wherein the cathode contains one or more metals selected from the group consisting of nickel (Ni), copper (Cu), iron (Fe), manganese (Mn), cobalt (Co), and an alloy thereof.

* * * * *